US011650345B2

(12) United States Patent
Wolfel et al.

(10) Patent No.: US 11,650,345 B2
(45) Date of Patent: May 16, 2023

(54) AUTONOMOUS SURFACE AND SUBSURFACE MARINE VEHICLE SURVEY SYSTEM, MARINE VEHICLE FOR SAME, AND METHOD OF USE

(71) Applicant: Terradepth, Inc., Austin, TX (US)

(72) Inventors: Josef Wolfel, Austin, TX (US); Judson A. Kauffman, Austin, TX (US); Andrew Resnick, Austin, TX (US); Kenneth L. Childress, Camano Island, WA (US); David L. Pearson, Austin, TX (US); Joseph Curcio, Gray, ME (US); Paul Holzer, Enfield, NH (US)

(73) Assignee: Terradepth, Inc., Austin, TX (US)

( * ) Notice: Subject to any disclaimer, the term of this patent is extended or adjusted under 35 U.S.C. 154(b) by 289 days.

(21) Appl. No.: 16/990,591

(22) Filed: Aug. 11, 2020

(65) Prior Publication Data
US 2021/0048544 A1 Feb. 18, 2021

Related U.S. Application Data

(60) Provisional application No. 62/885,652, filed on Aug. 12, 2019.

(51) Int. Cl.
*G01V 1/38* (2006.01)
*B63G 8/00* (2006.01)

(52) U.S. Cl.
CPC .......... *G01V 1/3852* (2013.01); *B63G 8/001* (2013.01); *G01V 1/3808* (2013.01); *G01V 1/3835* (2013.01); *B63G 2008/004* (2013.01)

(58) Field of Classification Search
CPC .. G01V 1/3852; G01V 1/3808; G01V 1/3835; B63G 8/001; B63G 2008/004; B63B 2211/02
See application file for complete search history.

(56) References Cited

U.S. PATENT DOCUMENTS

| 8,265,809 B2 * | 9/2012 | Webb | B63G 8/001 |
| | | | 114/337 |
| 9,417,351 B2 * | 8/2016 | Brizard | G01V 1/3843 |

(Continued)

FOREIGN PATENT DOCUMENTS

| KR | 10-2009-0069535 | 7/2009 | |
| WO | WO-03059734 A1 * | 7/2003 | ............... B63B 3/08 |

OTHER PUBLICATIONS

Nicholson et al, "The Present State of Autonomous Underwater Vehicle (AUV) Applications and Technologies", Marine Technology Society Journal, vol. 42, No. 1, p. 44-51, (Year: 2008).*

(Continued)

*Primary Examiner* — Ian J Lobo
(74) *Attorney, Agent, or Firm* — Dicke, Billig & Czaja, PLLC

(57) ABSTRACT

A system to perform marine surveying may include a pair of identical design autonomous marine survey vehicles configured for coordinated operations. The vehicles may navigate and transit from a launch location to a geographically distant designated survey location, continuously survey and transit to a designated recovery location. A pair of vehicles may operate interchangeably at the sea surface, semi-submerged and underwater. Each may generate energy when operating at the surface and store energy in a rechargeable battery to power vehicle operation. The payload may include a sensor system to acquire seabed sensor data. A data storage system may store the sensor data. An on-board payload quality control system may analyze data validity. Positioning when the vehicle is collecting seabed sensor data may be determined with high precision, to provide survey data of high precision.

17 Claims, 10 Drawing Sheets

(56) References Cited

U.S. PATENT DOCUMENTS

| | | | | |
|---|---|---|---|---|
| 9,457,879 | B2* | 10/2016 | Brizard | G01V 1/3852 |
| 9,718,523 | B2* | 8/2017 | Tan | B63G 8/001 |
| 9,891,333 | B2* | 2/2018 | Valsvik | G01V 1/3835 |
| 10,543,892 | B2* | 1/2020 | Postic | G01V 1/247 |
| 11,237,287 | B2* | 2/2022 | Mancini | G01V 1/3808 |
| 2014/0301161 | A1 | 10/2014 | Brizard et al. | |
| 2018/0224568 | A1* | 8/2018 | Brizard | G01V 1/3835 |
| 2019/0127034 | A1* | 5/2019 | Larson | G01S 17/87 |

OTHER PUBLICATIONS

Subsea World News—Offshore Energy, Business and Finance, "Consortium Completes New ASV/AUV Survey System Project," pp. 3 (Jul. 16, 2018). <https://subseaworldnews.com/2018/07/16/consortium-completes-new-asv-auv-survey-system-project/>.

Sheridan, Iain, "Drone Navigation in Polar and Cryospheric Regions," (Jun. 2019), Scott Polar Research Institute, Fitzwilliam College, University of Cambridge, submitted for the degree of Master of Philosophy, 123 pages.

Kongsberg Maritime, "Sounder USV System," Product Worksheet, 449199/A, pp. 2, (Retrieved Dec. 1, 2022). <https://www.kongsberg.com/contentassets/e7566e35d2864417a0e5a3899259f0eb/449199-usv-sounder-productsheet.pdf.>.

Pleskach, Maria, "WiMUST—A Fleet of AUVs for Seismic Surveys," Hydro International, pp. 15 (May 12, 2017). <https://www.hydro-international.com/content/article/wimust-a-fleet-of-auvs-for-seismic-surveys>.

* cited by examiner

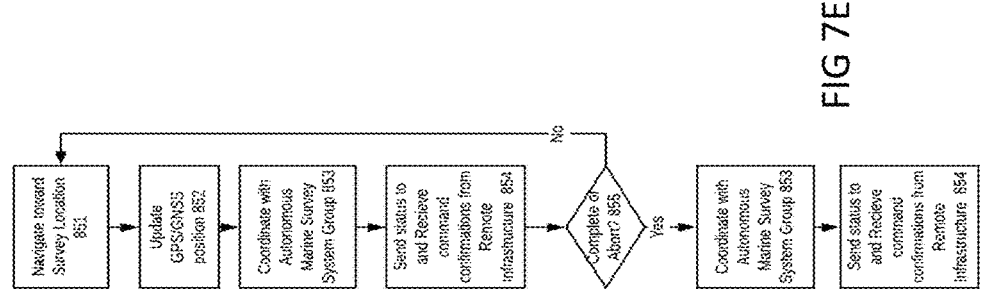
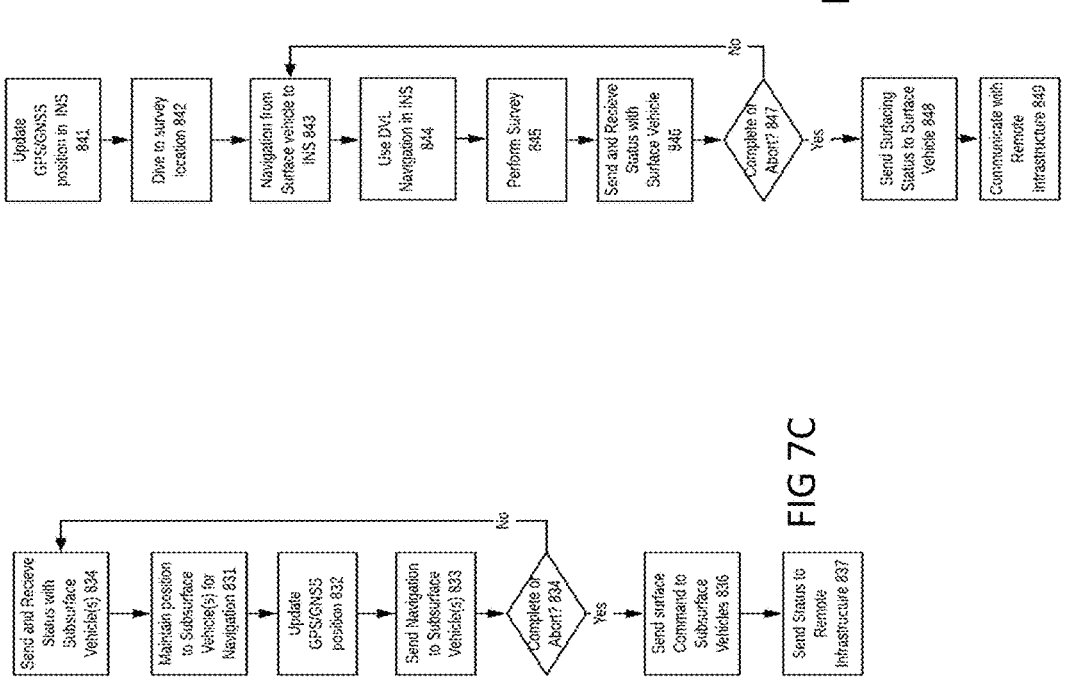
FIG 7E
FIG 7D
FIG 7C

AUTONOMOUS SURFACE AND SUBSURFACE MARINE VEHICLE SURVEY SYSTEM, MARINE VEHICLE FOR SAME, AND METHOD OF USE

CROSS-REFERENCE TO RELATED APPLICATIONS

This application is related to U.S. Provisional Application No. 62/885,652 filed Aug. 12, 2019 and titled "AUTONOMOUS SURFACE AND SUBSURFACE MARINE VEHICLE SURVEY SYSTEM, MARINE VEHICLE FOR SAME, AND METHOD OF USE" which is incorporated herein by reference, in entirety.

FIELD OF THE INVENTION

The present disclosure relates generally to autonomous surface and subsurface vehicle systems and methods for ocean operations, such as geophysical or oceanographic survey, hydrographic or bathymetric mapping, and search and mapping of the ocean.

BACKGROUND OF THE INVENTION

Currently, deep water Autonomous Underwater Vehicles (AUVs) or Unmanned Underwater Vehicles (UUVs) used for ocean survey operations may be operated from large manned vessels. Processing of survey data may be conducted onboard the manned vessel. Support for operations of the AUV and operations aboard the manned vessel may be provided by subject matter technical experts located on the manned vessel. The most capable manned vessels may support multiple AUVs (2-8) deployed from the manned vessel, to conduct short duration AUV missions that may last up to about 72 hours. The missions are restricted so that the AUVs remain in contact with the manned vessel via acoustic communications for substantially the entire duration of the mission. Recently, some ocean survey operators have added small Autonomous Surface Vehicles (ASVs) to extend the reach of the manned vessel's communications. In this arrangement, AUVs may be linked to the ASV by acoustic communications, and the ASV may be linked to the manned vessel by a line of sight communication system, such as line of sight radio having an operational limit of about 10 nautical miles (NMi). In other systems, wherein one or two AUVs may be operated from a smaller manned vessel, data collected by the AUVs may be processed onshore (e.g. echo-offshore.net). Ocean surveying with AUVs launched from a manned vessel, wherein a substantially continuous acoustic communication link is maintained between the AUV and manned vessel, with the AUV under control of human operators aboard the manned vessel controlling the AUV, has been practiced for decades with only incremental improvements from AUV and component manufacturers and the AUV operators.

BRIEF DESCRIPTION OF THE INVENTION

The above-mentioned shortcomings, disadvantages and problems are addressed herein, as may be understood by those skilled in the art upon reading and studying the following specification. This Summary is provided to introduce a selection of concepts in a simplified form that are further described below in more detail in the Detailed Description. This Summary is not intended to identify key or essential features of the claimed subject matter. Unless otherwise defined, all terms (including technical and scientific terms) used herein have the same meaning as commonly understood by one of ordinary skill in the art to which this disclosure belongs. It may be further understood that terms, such as those defined in commonly used dictionaries, should be interpreted as having a meaning that is consistent with their meaning in the context of the relevant art and the present disclosure, and may not be interpreted in an idealized or overly formal sense unless expressly so defined herein.

In an aspect of this disclosure, an autonomous marine vehicle survey system (AMVS system) may perform autonomous surveying and mapping of a marine environment, including the seabed and water column, by autonomous, coordinated, self-managed operations of a pair or larger group of identical design autonomous marine survey vehicles. As used herein, "identical design" is intended to mean and include vehicles having a common design and capable of being outfitted identically, or capable of having different trim or finish features such as, for example, different sensor packages. The AMVS system may perform autonomous navigation and transit from a geographically remote launch location to the predetermined survey locations, and then to a geographically remote recovery location. The AMVS system may include identical design first and second autonomous marine survey vehicles, or additional autonomous marine survey vehicles, that self-manage and repeatedly change between a surface vehicle role and a subsea vehicle role during transit and at the survey locations to provide efficient collection of survey data from the survey locations according to predetermined mission objectives. The autonomous marine survey vehicle in the subsea vehicle role may self-manage in coordination with the other vehicles in the survey group its: positioning, surveying and mapping, and communications with the surface vehicle. The autonomous marine survey vehicle in the surface vehicle role may self-manage, in coordination with the other vehicles in the survey group its: positioning, navigation and communications with GPSS and/or GPS systems, data communications over wireless networks such as satellite-based wireless data communications networks, and with the subsea vehicle over a suitable subsea communications system such as, for example, an acoustic modem system.

In an aspect of this disclosure, a method for autonomous surveying a marine environment at a selected location may be performed. Such method may include first providing a selected survey location to an autonomous marine vehicle survey system (AMVS System) that includes a pair or larger group of identical design autonomous marine survey vehicles. The method may include second providing to the autonomous marine vehicle survey system, a transit route for the pair or larger survey-group of identical design autonomous marine survey vehicles to travel from a launch location to the predetermined survey location. The method may include first and second or more autonomous marine survey vehicles self-managing their own operations in coordination with the other vehicle's in their AMVS system and repeatedly changing between a surface vehicle role and a subsea vehicle role during the transit and at the survey location, to perform collection of survey data from the survey location according to a predetermined mission objective. In an embodiment, the collection of survey data may be continuous. The method may include the autonomous marine survey vehicle in the subsea vehicle role self-managing, in coordination with the other vehicles in its survey group, the: positioning, surveying and mapping, and communications with the surface vehicle. The method may include the autonomous marine survey vehicle in the surface vehicle role may self-manage in coordination with the other vehicles in the group its: positioning, navigation and communications with GPSS and/or GPS systems, data communications over wireless networks such as satellite-based wireless data communications networks, and with the subsea vehicle over a suitable subsea communications system such as, for example, an acoustic modem system.

Apparatus, systems, and methods of varying scope are described herein. These aspects are indicative of various non-limiting ways in which the disclosed subject matter may be utilized, all of which are intended to be within the scope of the disclosed subject matter. In addition to the aspects and advantages described in this summary, further aspects, features, and advantages may become apparent by reference to the associated drawings, detailed description, and claims.

BRIEF DESCRIPTION OF THE DRAWINGS

The disclosed subject matter itself, as well as further objectives, and advantages thereof, may best be illustrated by reference to the following detailed description of embodiments of the device read in conjunction with the accompanying drawings, wherein:

FIG. 7C is a simplified flowchart illustrating a method for operating an autonomous marine survey vehicle in surface role, in an exemplary embodiment.

FIG. 7D is a simplified flowchart illustrating a method for operating an autonomous marine survey vehicle in a subsurface role, in an exemplary embodiment.

FIG. 7E is a simplified flowchart illustrating a method for operating an autonomous marine survey vehicle in a transit role, in an exemplary embodiment.

DETAILED DESCRIPTION OF THE INVENTION

Figure 1:
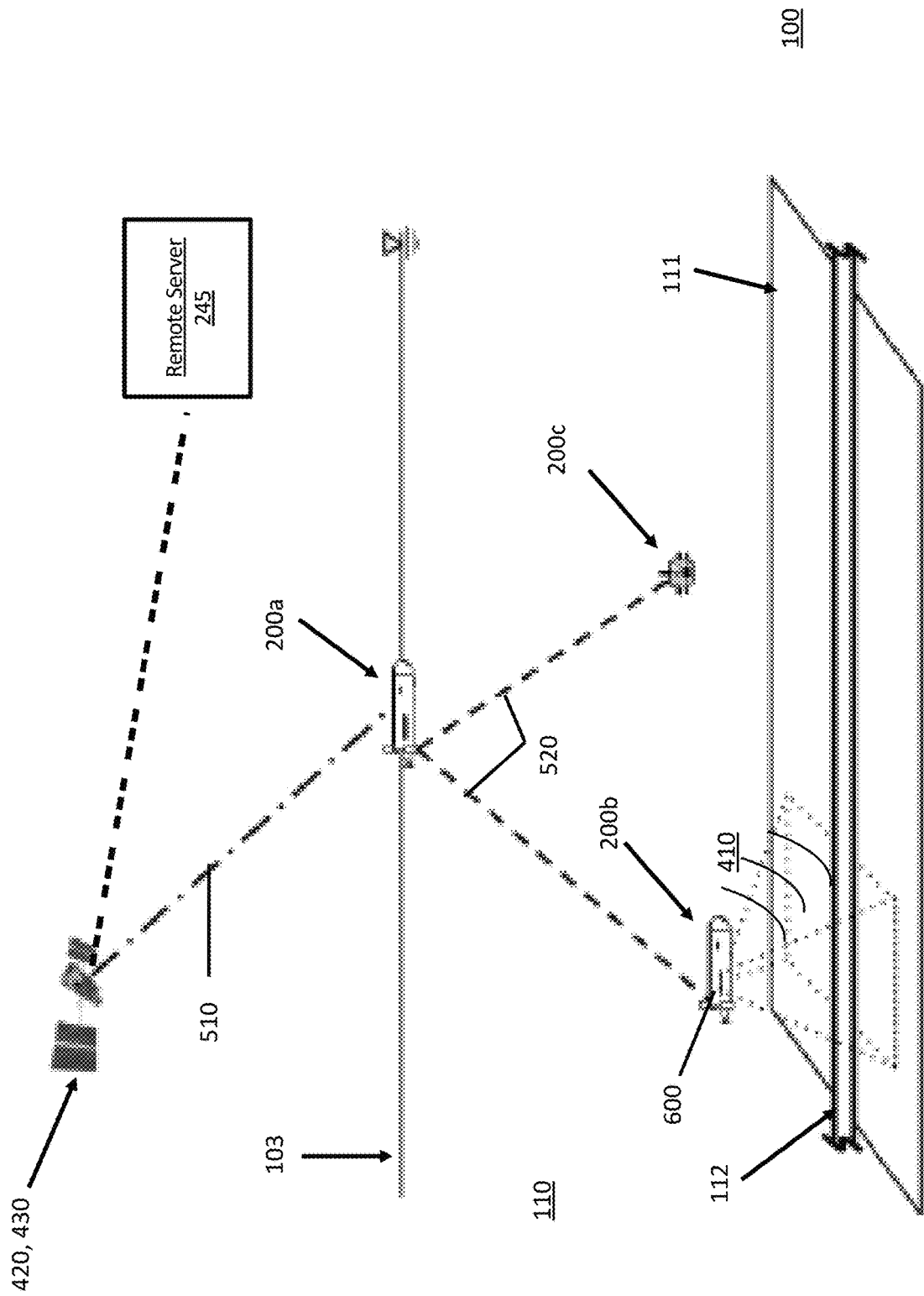
FIG. 1 is a simplified schematic diagram illustrating an autonomous marine survey system, consisting of three autonomous marine survey vehicles, in an ocean environment, according to an exemplary embodiment.
Figure 2:
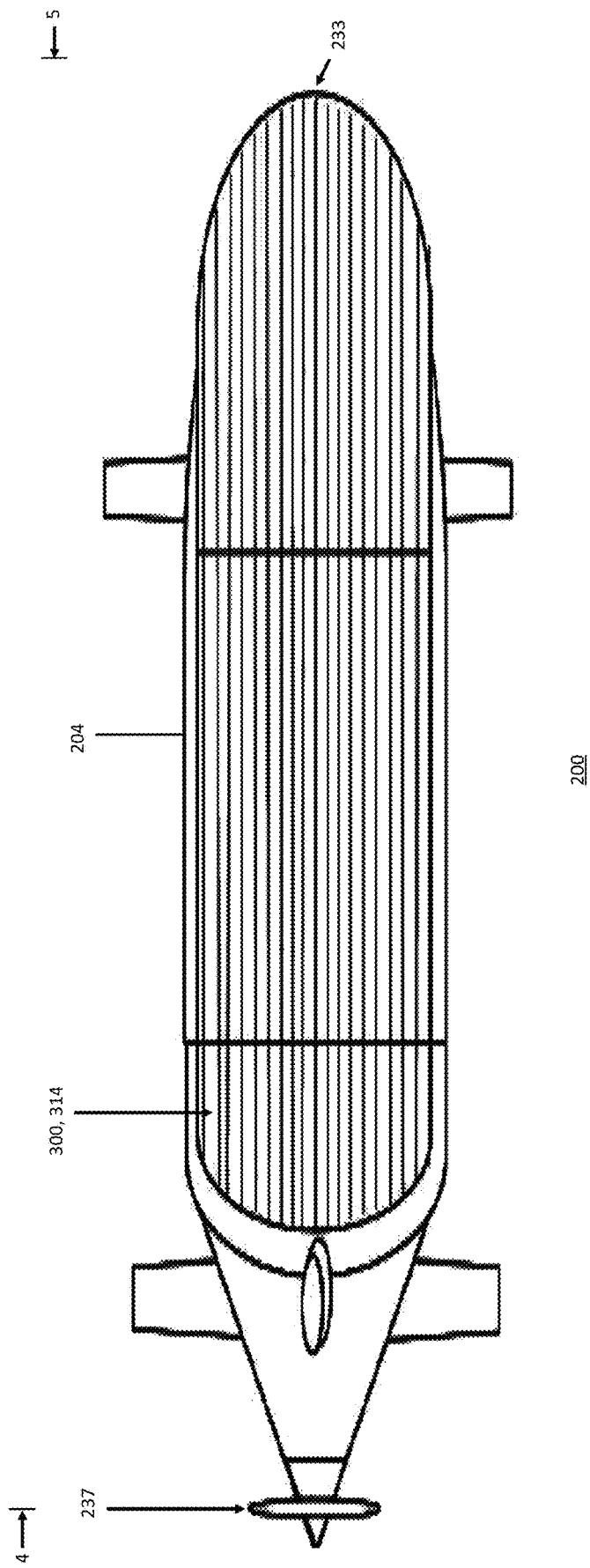
FIG. 2 is a simplified top view of an autonomous marine survey vehicle in an exemplary embodiment.
Figure 3:
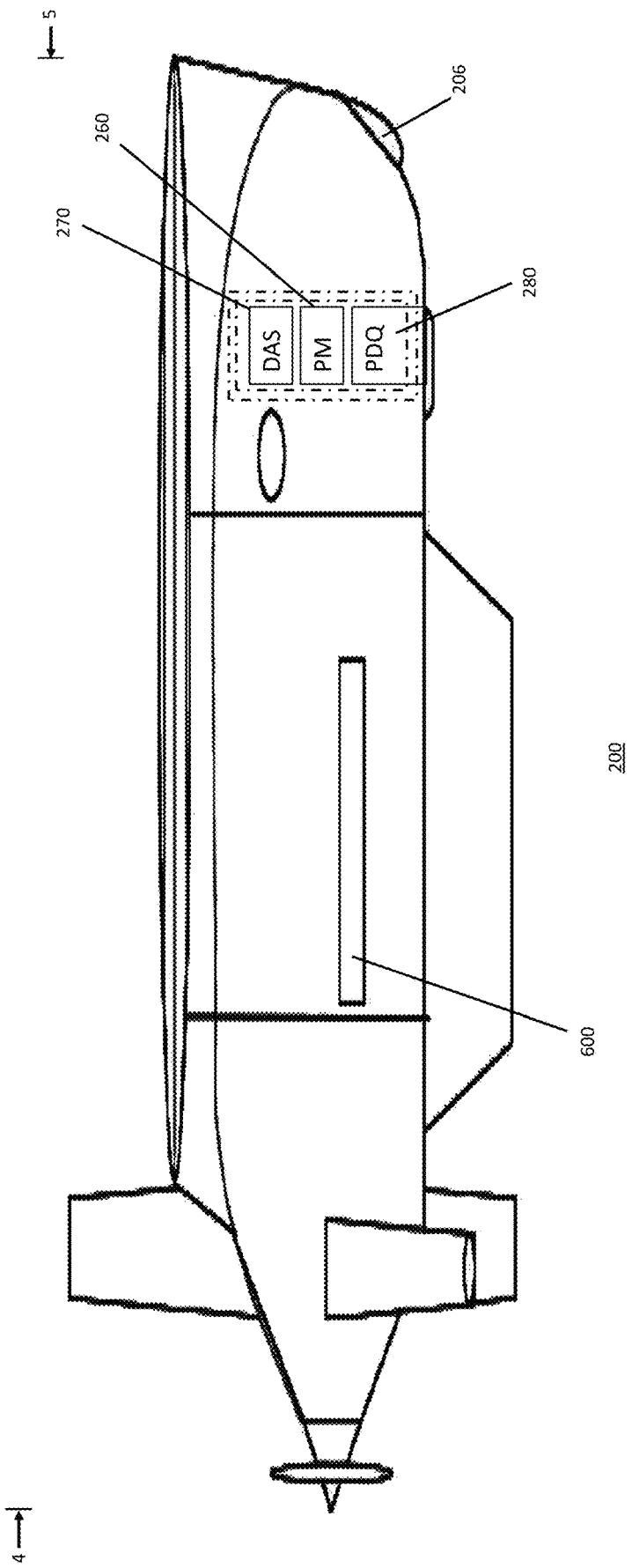
FIG. 3 is a simplified side view of the autonomous marine survey vehicle, taken generally along 3-3 in FIG. 2.
Figure 4:
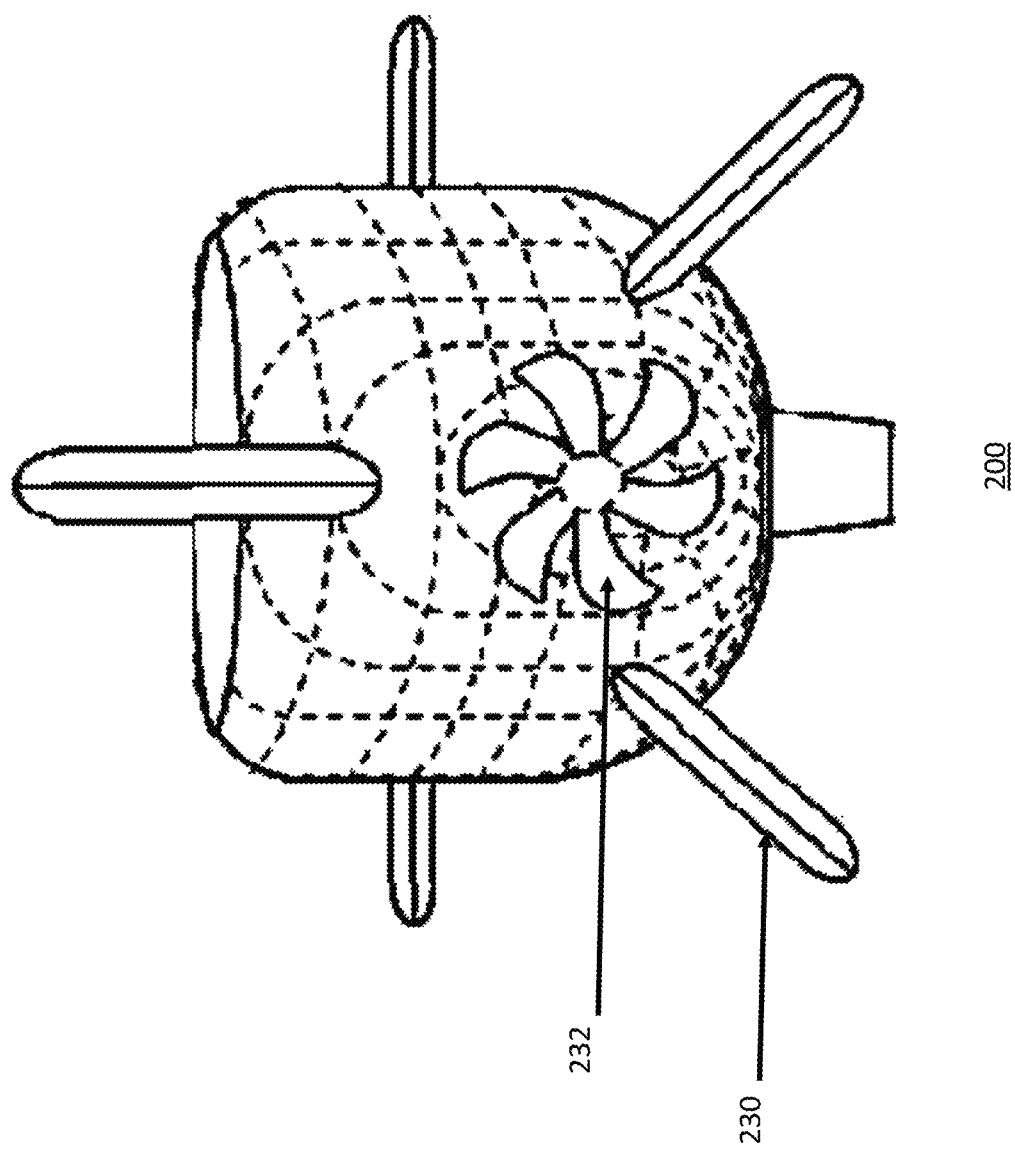
FIG. 4 is a simplified rear view of the autonomous marine survey vehicle, taken generally along 4-4 in FIG. 2.
Figure 5:
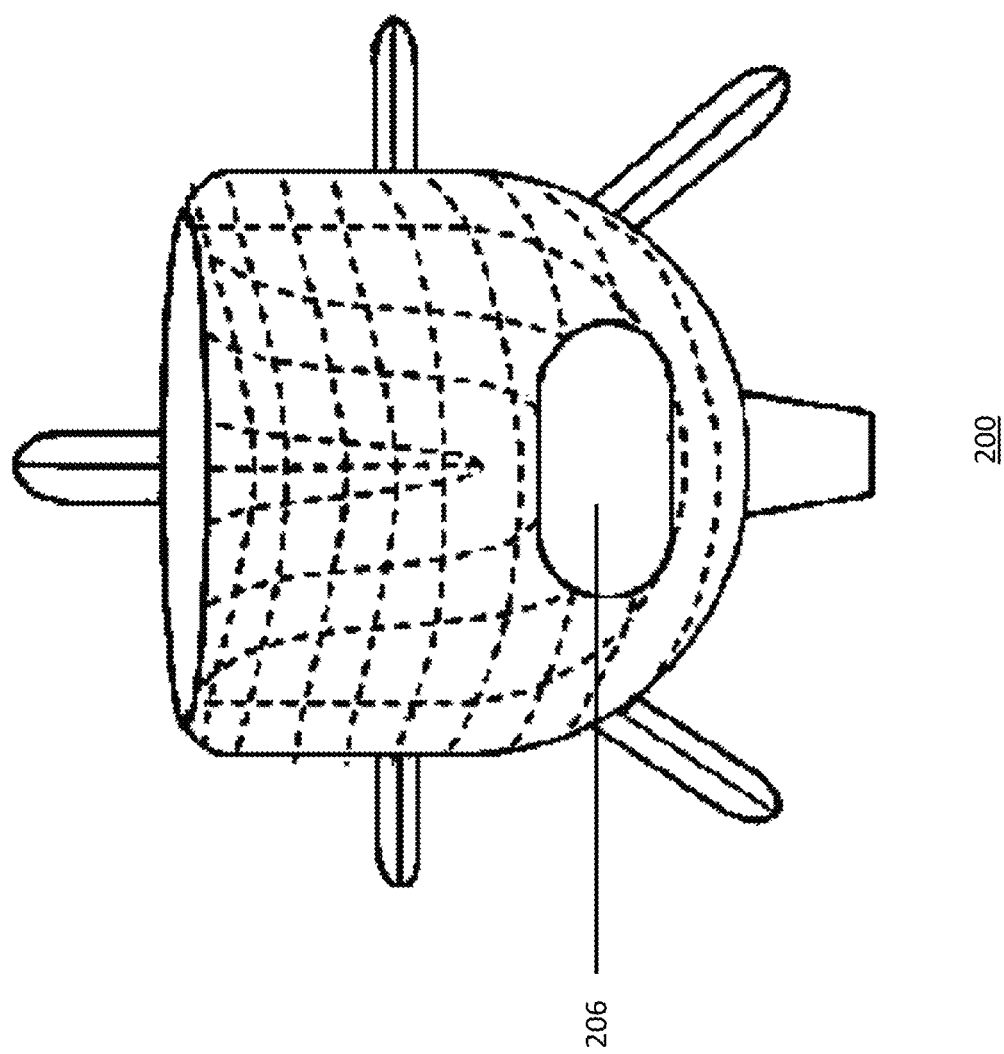
FIG. 5 is a simplified front view of the autonomous marine survey vehicle, taken generally along 5-5 in FIG. 2.

In the following detailed description, reference is made to the accompanying drawings which form a part hereof, and in which is shown by way of illustration specific embodiments which may be practiced. These embodiments are described in sufficient detail to enable those skilled in the art to practice the embodiments and disclosure. It is to be understood that other embodiments may be utilized, and that logical, mechanical, electrical, and other changes may be made without departing from the scope of the embodiments and disclosure. In view of the foregoing, the following detailed description is not to be taken as limiting the scope of the embodiments or disclosure.

The terminology used herein is for the purpose of describing particular embodiments only and is not intended to be limiting. As used herein, the singular forms "a", "an", and "the" are intended to include the plural forms as well, unless the context clearly indicates otherwise. It may be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It may be appreciated that for simplicity and clarity of illustration, where considered appropriate, reference numerals may be repeated among the figures to indicate corresponding or analogous elements. In addition, numerous specific details are set forth in order to provide a thorough understanding of the implementations described herein. However, it may be understood by those of ordinary skill in the art that the implementations described herein may be practiced without these specific details. In other instances, well-known methods, procedures and components have not been described in detail so as not to obscure the implementations described herein. Also, the description is not to be considered as limiting the scope of the implementations described herein. The detailed description set forth herein in connection with the appended drawings is intended as a description of exemplary embodiments in which the presently disclosed apparatus and system maybe practiced. The term "exemplary" used throughout this description means "serving as an example, instance, or illustration," and should not necessarily be construed as preferred or advantageous over other embodiments.

FIG. 1 is a simplified schematic diagram illustrating an autonomous marine survey system 100 operating in an ocean environment 110, in an exemplary embodiment. System 100 may perform autonomous marine surveying of the ocean environment 110 in a designated survey location depicted in FIG. 1 by a suitable autonomous marine survey vehicle 200 as disclosed. The ocean environment 110 may include the seabed 111 and water column extending upwards from the seabed to the sea surface 103. In addition to seabed surface features that may include man-made objects 112 such as, for example, pipelines or communication cable bundles, the seabed 111 may include subsurface geological features such as, for example, geological formations containing hydrocarbon deposits or mineral deposits to be mined. It may be understood that properties of subsurface geological features may be determined and mapped in two dimensions, or three dimensions, by sensors that may be included in the autonomous marine survey system 100 as herein disclosed. System 100 may include a pair, or larger group, of identical design autonomous marine survey vehicles 200a, 200b, 200c in communication with each other.

In the particular embodiment shown in FIG. 1, system 100 may include a group, set or plurality of the autonomous marine survey vehicles 200a, 200b, 200c. In an embodiment, each of the autonomous marine survey vehicles 200a, 200b, 200c may be identical to the autonomous marine survey vehicle 200 described in detail herein and shown in FIGS. 2-6. Returning to FIG. 1, the autonomous marine vehicles 200a, 200b, 200c may be configured for communication with each other and with remote wireless communications systems 430, and for autonomous coordinated operations to perform a detailed survey, mapping, or both, of the ocean environment 110 at the designated survey location. The remote wireless communications systems may be radio communications using satellite, cellular, WIFI networks, or other radio frequency communications. The autonomous marine vehicles 200a, 200b, 200c may be configured for beacon based navigation 420 using satellite, terrestrial, or other based beacons such as Global Navigation Satellite System (GNSS) and/or Global Positioning System (GPS). In the particular embodiment shown in FIG. 1, the group of autonomous marine survey vehicles 200a, 200b, 200c may be identical. The group of autonomous marine survey vehicles 200a, 200b, 200c may be configured to operate in a cooperative manner, interchangeably in the water at the sea surface, semi-submerged with a mast extending above water (not shown), and underwater (fully submerged). The group of autonomous marine survey vehicles 200a, 200b, 200c may navigate and transit from a launch location (not shown) to the geographically distant designated survey location. The group of autonomous marine survey vehicles 200a, 200b, 200c may continuously survey the ocean environment 110 at the designated survey location to perform a predetermined surveying mission, and thereafter transit to a designated recovery location (not shown). The group of autonomous marine survey vehicles 200a, 200b, 200c may perform subsea survey and data gathering operations at the designated survey location, in an autonomous, cooperative manner.

As shown in FIG. 1, in an embodiment, the autonomous marine survey system 100 include a remote server 245 configured for monitoring and supervision over a suitable communication link, such as the remote wireless communications systems 430. The remote server 245 may get status from and send commands to each one of the autonomous marine survey vehicles 200 when in a surface vehicle role. Remote server 245 may be located on land or aboard a manned vessel. The remote server 245 for example, may be configured to provide updated mission parameters to each autonomous marine survey vehicle 200 from time to time. The remote server 245 for example, may be configured to receive mission reports and mission logs from each autonomous marine survey vehicle 200 from time to time.

FIGS. 2, 3, 4, 5 and 6 illustrate aspects of an autonomous marine survey vehicle 200. Referring to FIG. 1, it may be understood that, in an embodiment, each one of the autonomous marine survey vehicles 200a, 200b, 200c may have a construction identical to generic autonomous marine survey vehicle 200 and depicted in FIGS. 2, 3, 4, 5 and 6. In an embodiment, each one of the autonomous marine survey vehicles 200a, 200b, 200c may be identical to the autonomous marine survey vehicle 200 in the exemplary embodiment illustrated in FIGS. 2-6.

Referring to FIGS. 2-5, the autonomous marine survey vehicle 200 may include a submarine hull and structure 204 which may be configured with multiple one (1) atmosphere pressure housings. Hull 204 may be configured to possess endurance capabilities of a manned submarine. Hull 204 may be configured to possess a high efficiency form factor that provides high subsurface efficiency. The autonomous marine survey vehicle 200 may include sonars 206 for navigation.

Figure 6:
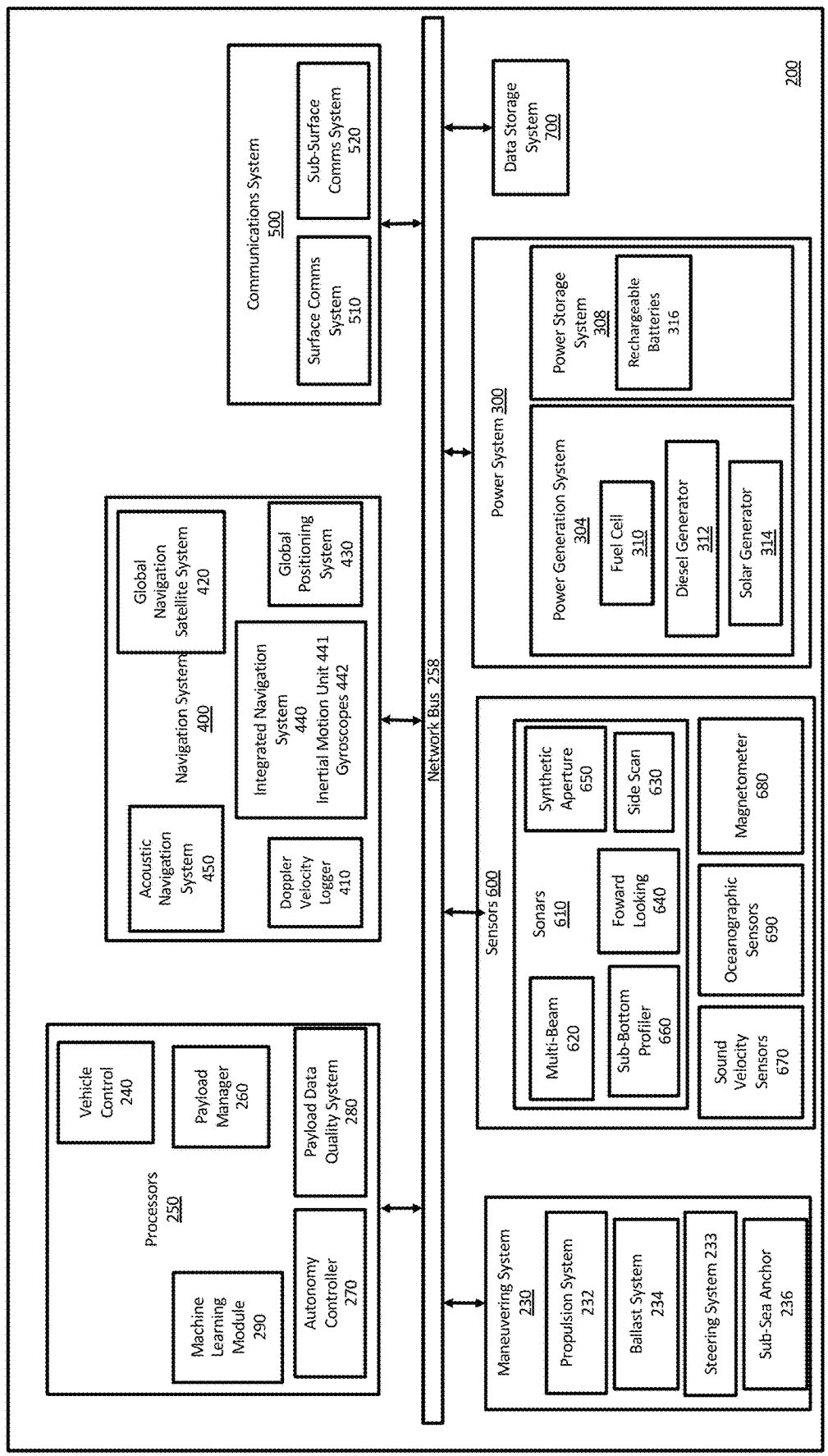
FIG. 6 is a simplified, partial schematic diagram illustrating an autonomous marine survey system in an exemplary embodiment.

As shown in FIG. 6, the autonomous marine survey vehicle 200 may include one or more computing systems, which may include a processor or multiple processors 250 ("processor or multiple processors 250", collectively, being hereinafter "processors 250"), memory accessible by the processors 250, and data-storage 700. Processors 250 may be configured to access data-storage 700 to perform operations with data in data-storage 700. It may be understood that data-storage 700 may include a non-transitory computer readable medium. Data-storage 700 may include executable instructions which, when executed in processors 250, cause the processors 250 to perform the steps of a method as elsewhere disclosed herein. The autonomous marine survey vehicle 200 may include a system network bus 258 in communication with processors 250 and other system elements.

As shown in FIG. 6, the autonomous marine survey vehicle 200 may include a plurality of modules each including instructions executable by processors 250. It may be understood that each module, whether whole or in part, may be embodied in software, hardware, or both. More particularly, as shown in FIG. 6, the autonomous marine survey vehicle 200 may include a payload manager 260 module including instructions of a payload manager algorithm, executable by processors 250. Payload manager 260, for example, may be configured to manage operations of the payload, including a payload of sensors 600. The autonomous marine survey vehicle 200 may include the payload manager 260 module being configured to control the communications system 500, power system 300, navigation system 400, sensor system 600, data storage system 700, maneuvering system 230, Payload Manager 260, machine learning module 290, and on-board payload quality control system 280. The payload may include sensor system 600 including one or more sensors configured to acquire sensor data for the marine environment 110, such as acoustic and optical imagery of the seabed 111. The Payload Manager 260 may be configured for communication with data storage system 700 that is configured to store the sensor data including image data. The on-board payload quality control system 280 may be configured to perform analysis of sensor operations and analysis of data quality for sensor data collected by the sensors. As shown in FIG. 6, the autonomous marine survey vehicle 200 may include a Payload Manager 260 module including instructions of a data acquisition algorithm, executable by processors 250. It may be understood that Payload Manager 260 may manage and facilitate data acquisition by sensors 600.

As shown in FIG. 6, the autonomous marine survey vehicle 200 may include a payload quality control system 280 module including instructions of a payload quality control algorithm, executable by processors 250. As shown in FIG. 6, the autonomous marine survey vehicle 200 may include a machine learning module 270 including instructions of a machine learning algorithm, executable by processors 250.

Referring to FIG. 6, the autonomous marine survey vehicle 200 may include data storage system 700 in communication with network bus 258. Data storage system 700 may be accessible to store terabytes (TB) of data collected by sensors 600 during survey operations, on-board autonomous marine survey vehicle 200.

Referring to FIG. 6, the autonomous marine survey vehicle 200 may include communications system 500 configured to provide communication links between the vehicles 200a, 200b, and 200c, in a group of autonomous marine survey system vehicles 200a, 200b, 200c and with remote infrastructure. The remote infrastructure may include a remote server 245. Communications system 500 may include a surface communications system 510 and sub-surface communications system 520. The surface communications system 510 may include, for example, WIFI network, and/or wireless telephone or data (i.e. 4G) transceiver, or satellite data (i.e., Iridium) transceiver. The sub-surface communications system 510 may include, for example, an acoustic modem system or connection to a subsea communications system.

Referring to FIG. 6, the autonomous marine survey vehicle 200 may include maneuvering system 230. As shown in FIGS. 2-4 and 6, maneuvering system 230 may include propulsion system 232, steering system 233, ballast system 234, and sub-sea anchor 236. Propulsion system 232 may include a motor (not shown), such as an electric motor (not shown) connected to a power system 300 and driving connected via a transmission (not shown) to a drive shaft (not shown) for rotating a propeller or screw 237 (see FIGS. 2-4). As shown in FIGS. 2-5 and 6, maneuvering system 230 may include a plurality of controllable hydrodynamic surfaces on the exterior of the hull as a steering system and stern trim elements 233 configured to enable the autonomous marine survey vehicle 200 to travel, and loiter, when submerged or on the sea surface. Referring to FIG. 6, the ballast system 232 may include a plurality of ballast tanks (not shown) housed within hull 204 (see FIG. 2). Ballast tanks may be in controlled fluid communication with water in the ocean environment to be filled with such water to serve as ballast, and to enable such water ballast to be evacuated therefrom, and also may be in controlled fluid communication with a supply of air for selectively filling the ballast tanks therewith during surface operations. Maneuvering system 230 may include a subsea anchor 236. Subsea anchor 236 may be deployed to maintain or keep the autonomous marine survey vehicle 200 in a fixed location, at a particular depth above the seabed, or both.

Referring to FIG. 6, the autonomous marine survey vehicle 200 may include navigation system 400. Navigation system 400 may include an integrated navigation system 440 in communication with a mission autonomy sub-module of the payload manager 260 module. The vehicle control 240 may be instructed by the autonomy controller 270 to perform mission essential navigation. Navigation system 400 may include beacon-based navigation system 420 such as the Global Navigation Satellite System (GNSS) and/or Global Positioning System (GPS) position information and/or remote wireless communications systems 430 position information for the autonomous marine survey vehicle 200*a* located and operating at the sea surface, in the surface vehicle role. Navigation system 400 may include an Inertial Navigation System (INS) that may include an inertial motion unit and gyroscope configured for precise positioning and navigation of the submerged, subsea vehicle 200*b*, in the subsea vehicle role. Such an Integrated Navigation System (INS) may incorporate, in addition to the GNSS position information and/or GPS position information received from the surface vehicle 200*a*, inertial measurements 441, gyroscopic measurements 442, Doppler Velocity Logger (DVL) 410 information, Forward Looking Sonar (FLS) information, and acoustic Navigation System position information. The Integrated Navigation System (INS) thus may provide position, orientation and velocity information for both the surface and the submerged, subsea autonomous marine survey vehicle 200*a* and 200*b*. Periodic communications between the surface vehicle 200*a* and subsea vehicle 200*b* may provide updated information to be passed there between and to be utilized by the subsea vehicle 200*b* to reduce positioning error, based on updated position information for the surface vehicle 200*a*.

Referring to FIG. 6, each autonomous marine survey vehicle 200 may include a power system 300 configured to produce energy on-board and store such energy on-board, to power operation of the autonomous marine survey vehicle 200. The power system 300 may include a power generation system 304 and a power storage system 308, as shown in FIG. 6. As shown in FIG. 6, the power generation system 300 may include, for example, an air dependent power plant such as a fuel cell 310 or diesel generator 312. As shown in FIG. 6, the power generation system 300 may include, for example, an independent power generation system such as a solar power generator 314. The power storage system 308 may include a rechargeable battery 316, such as a lithium ion battery or lithium polymer battery, or a chemical structure providing suitable energy density. In an embodiment, for example, the power storage system may include a rechargeable lithium ion battery or array of the same.

Referring to FIG. 6, the autonomous marine survey vehicle 200 may include sensor system 600. Sensor system 600 may be configured to conduct sea bottom survey and data collection utilizing a sensor payload and navigation system information, including Inertial Navigation System (INS) 440 information for the subsea vehicle 200*b*. The navigation system information and Inertial Navigation System (INS) information may be available from the on-board navigation system 400, as described elsewhere herein. Referring to FIG. 6, the sensor system 600 may include one or more of the following sensors: forward looking sonar 640, multi-beam echo sounder sonar 620, side scan sonar 630, synthetic aperture sonar 650, sub-bottom profilers 660, magnetometers 680, sound velocity sensors 670, and ocean property sensors 690.

According to embodiments, a plurality of autonomous marine survey vehicles 200 may operate in pairs or larger groups, in a coordinated, autonomous, self-managed manner to efficiently and effectively survey the ocean environment, including the water column and the seafloor at a predetermined survey location. Groups of two or more vehicles 200 each of identical design are capable of operating, interchangeably, on the sea surface, semi-submerged with a mast above water, and underwater, fully submerged. Systems as disclosed are capable of being launched from shore or from a larger vessel, transiting long distances to reach a designated area and autonomously performing subsea survey and data gathering operations, and returning either to the launch location or another designated recovery location.

Referring to FIGS. 7A, 7B, 7C, 7D and 7E the autonomous marine survey system operates in Modes 810 which may be made up of Steps 820 which include Surface Role 830 and Subsurface Role 840. The autonomous marine survey system's Modes 810 may be executed by two or more autonomous marine survey vehicles each performing the Steps 820 and either the Surface Role 830 or Subsurface Role 840.

Figure 7B:
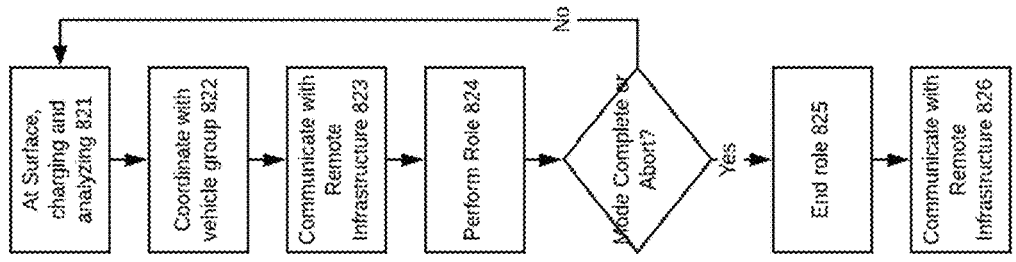
FIG. 7B is a simplified flowchart illustrating a method for operating an autonomous marine survey vehicle in transit or survey mode, in an exemplary embodiment.
Figure 7A:
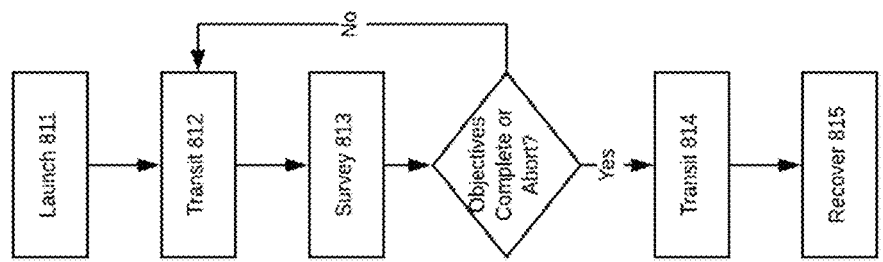
FIG. 7A is a simplified flowchart illustrating a method for operating an autonomous marine vehicles surveying system, in an exemplary embodiment.

As shown in FIG. 7A, an embodiment is disclosed of a method 810 for the operation of the autonomous marine vehicle survey system in Modes that apply to all autonomous marine survey vehicles in a group. Method 810 may include launching or operating in launch mode 811. The autonomous marine vehicle survey system may start operation in the Launch mode 811 where all the vehicles are put in the ocean and commanded into autonomous operation. Method 810 may include transiting or operating in transit mode 812. Once in autonomous operation all the vehicles may enter Transit mode 812 to travel to the survey location. Method 810 may include surveying or operating in survey mode 813. Upon arrival at the survey location all the vehicles may enter Survey mode 813 to conduct the survey at that location. When the survey at a location is complete the vehicles may autonomously decide if all the objectives are complete or there is a status to abort then Transit 814 to the port to be Recovered 815, or if there remain locations to be surveyed Transit 812 to the next survey's location. Method 810 may include transiting or operating in transit mode 814 to the port. Method 810 may include recovering or operating in recover mode 815 to be recovered at the port.

FIG. 7B shows steps of a method 820 that each vehicle may follow in Transiting 812, Transiting 814, or Surveying 813 Modes. Method 820 may include surface charging and analyzing 821 vehicle status to determine role. The steps of method 820 may start with the vehicle at the surface at the completion of charging the Power Storage System with the Power Generation System, the processing of the data by the Payload Data Quality System, and the analyzing 821 vehicle status, by the Autonomy Control, to determine whether the vehicle is in the surface role 830, subsurface role 840, or transit role 850. Method 820 may include coordinating vehicle roles with the vehicle group 822, wherein the vehicles may then autonomously coordinate roles 822. Method 820 may include communicating with remote infrastructure 823, wherein the vehicle may then communicate with the remote infrastructure 823 via the Surface Communication System sending status and plan summary and receiving confirmation to proceed. Method 820 may include performing role 824, wherein each vehicle may then perform it's coordinated Role 824, which are detailed in Surface Role 830, Subsurface Role 840, and Transit Role 850. At the end of the Role the Autonomy Control evaluates if the Mode is complete or if the vehicle status requires an abort. If the Mode is in completed and the vehicle status is ok to continue, then vehicle may restart the method steps with Surface charging and analyzing 821, otherwise the vehicle may end the Mode and send the status to the Remote Infrastructure 826. Method 820 thus may include ending role 825. Method 820 thus may include communicating to send the status to the remote infrastructure 826.

FIG. 7C shows the method of the Surface Role 830 of an autonomous marine survey vehicle. Method 830 may include exchanging status 834. Upon beginning the surface role, the vehicle may exchange status including position with the vehicle in the subsurface role 834. Method 830 may include maintaining position for navigation 831, wherein the surface vehicle may navigate relative to the subsurface vehicle to maintain good navigation and communications with the subsurface vehicle 831. Method 830 may include updating position 832, wherein the surface vehicle may keep updating its position 832 by updating GPS or GNSS position. Method 830 may include sending navigation 833 to the subsurface vehicle, wherein the position of the surface vehicle and the range and bearing to the subsurface vehicle may be sent to the subsurface vehicle 833. Method 830 may include determining 834, wherein the autonomous controller may determine if the Role is complete or if the status is abort. If the Role is incomplete and the status is ok to continue the vehicle may restart the method at send and receive status 834. Method 830 may include sending a surface command 836 to the subsea vehicle, wherein if the Role is complete or if the status is abort, then the surface vehicle may send a surface command to the subsea vehicle 836. Method 830 may include sending status information 837, wherein the surface vehicle sends status information to the remote infrastructure 837, and ends the role.

FIG. 7D shows the method of the Subsurface Role 840 of an autonomous marine survey vehicle. Method 840 may include updating position 841. In updating position 841, upon beginning the subsurface role, the vehicle may update the position in the Inertial Navigation System (INS) with GPS or GNSS position. Method 840 may include diving 842, wherein the vehicle may then dive to the survey location 842. Method 840 may include navigating from surface vehicle 843, wherein the subsurface vehicle may exchange navigation status including position with the vehicle in the surface role 843. Method 840 may include DVL navigating 844, wherein the subsurface vehicle may use the Doppler Velocity Log (DVL) to aid navigation 844. Method 840 may include surveying 845, wherein the subsurface vehicle may navigate and operate the payload equipment to perform the survey 845. Method 840 may include exchanging status information 846, wherein the subsurface vehicle may exchange status information with the surface vehicle 846. Method 840 may include determining 847, wherein the autonomous controller may determine if the Role is complete or if the status is abort 847. Method 840 may include restarting navigating from surface vehicle 843, wherein if the Role is incomplete and the status is ok to continue the vehicle may restart the method at Navigation from Surface Vehicle 843. Method 840 may include sending surfacing status 848, wherein if the Role is complete or if the status is abort then the vehicle may send surfacing status to the surface vehicle 848. Method 840 may include communicating with remote infrastructure 849, wherein upon reaching the surface the vehicle may send status information to the remote infrastructure 849 and end the role.

The method for the Transit Role 850 is shown in FIG. 7E. Method 850 may include transit navigating 851. In transit navigating 851, the Transit Role may begin with the vehicle navigating toward the survey location and may use pre-planned routes, autonomously planned routing, or autonomous corrections to pre-planned routes 851. Method 850 may include updating position 852, wherein the vehicle may keep updating its position by GPS or GNSS 852. Method 850 may include coordinating position information with the vehicle group 853, wherein the vehicle may communicate status and coordinate with the other vehicles transiting in the Autonomous Marine Survey System Group 853. Method 850 may include communicating with remote infrastructure 854, wherein the vehicle may send status information to and receive command confirmation from the remote infrastructure 854. Method 850 may include determining 855, wherein the autonomous controller may determine if the Role is complete or if the status is abort 855. Method 850 may include restarting transit navigating 851, wherein if the Role is incomplete and the status is ok to continue the vehicle may restart the method at navigate toward survey location 851. Method 840 may include resuming coordinating position information with the vehicle group 853, wherein, wherein if the Role is complete, i.e. the vehicle is at the survey location, or if the status is abort, then the vehicle may communicate status and coordinate with the other vehicles transiting in the Autonomous Marine Survey System Group 853. Method 840 may include communicating with remote infrastructure 854, wherein the vehicle may send status information to the remote infrastructure 837 and end the role.

Figure 8:
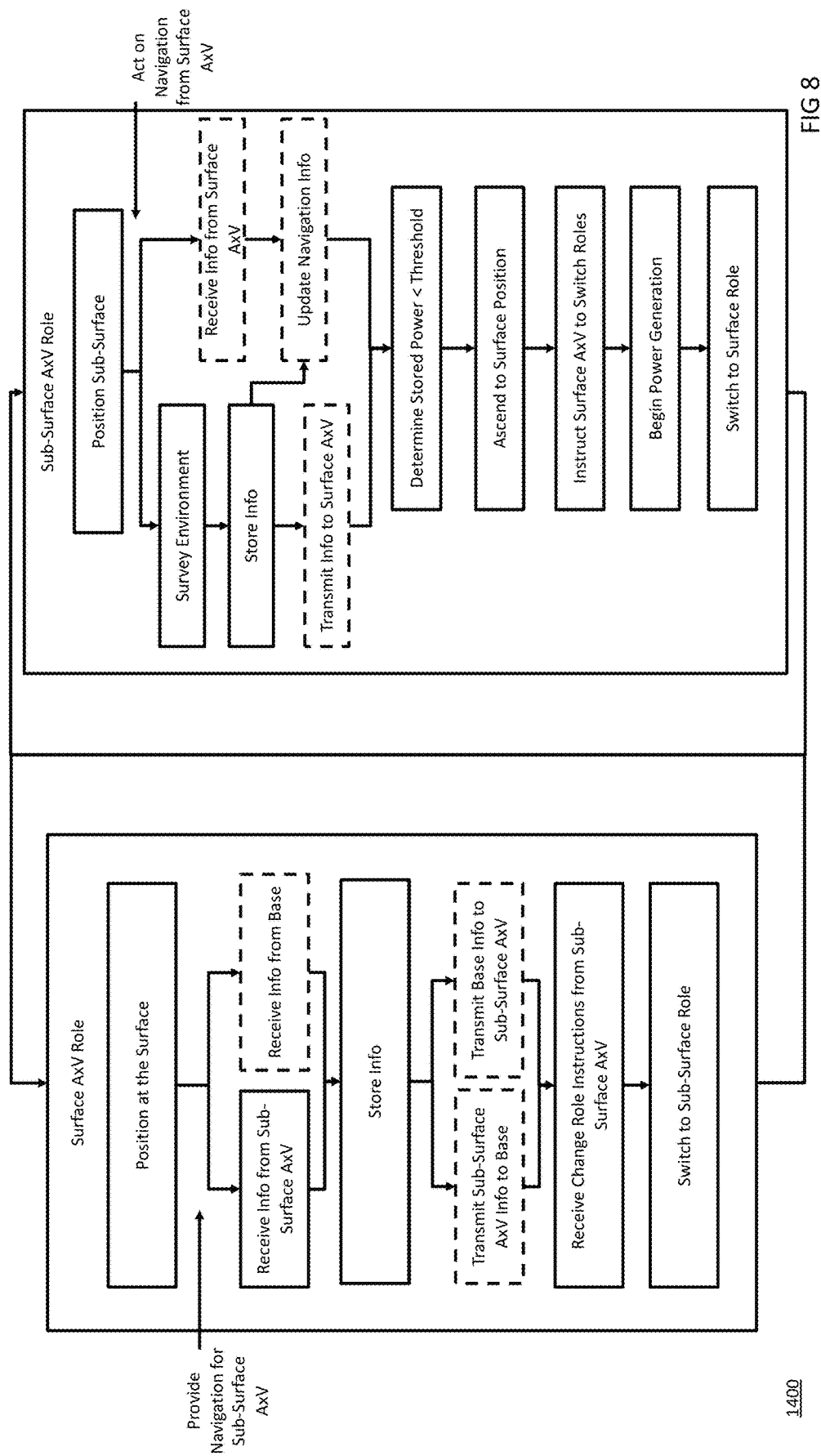
FIG. 8 is a simplified flowchart illustrating a method for autonomous marine surveying, in an exemplary embodiment.

Illustrated in FIG. 8 is an exemplary method 1400 for autonomous marine survey. It may be understood that, except as otherwise illustrated, method 1400 may be identical to method 830 (shown in FIG. 7C) in relation to the surface vehicle role, and identical to method 840 (shown in FIG. 7D) in relation to the subsea vehicle role.

Figure 9:
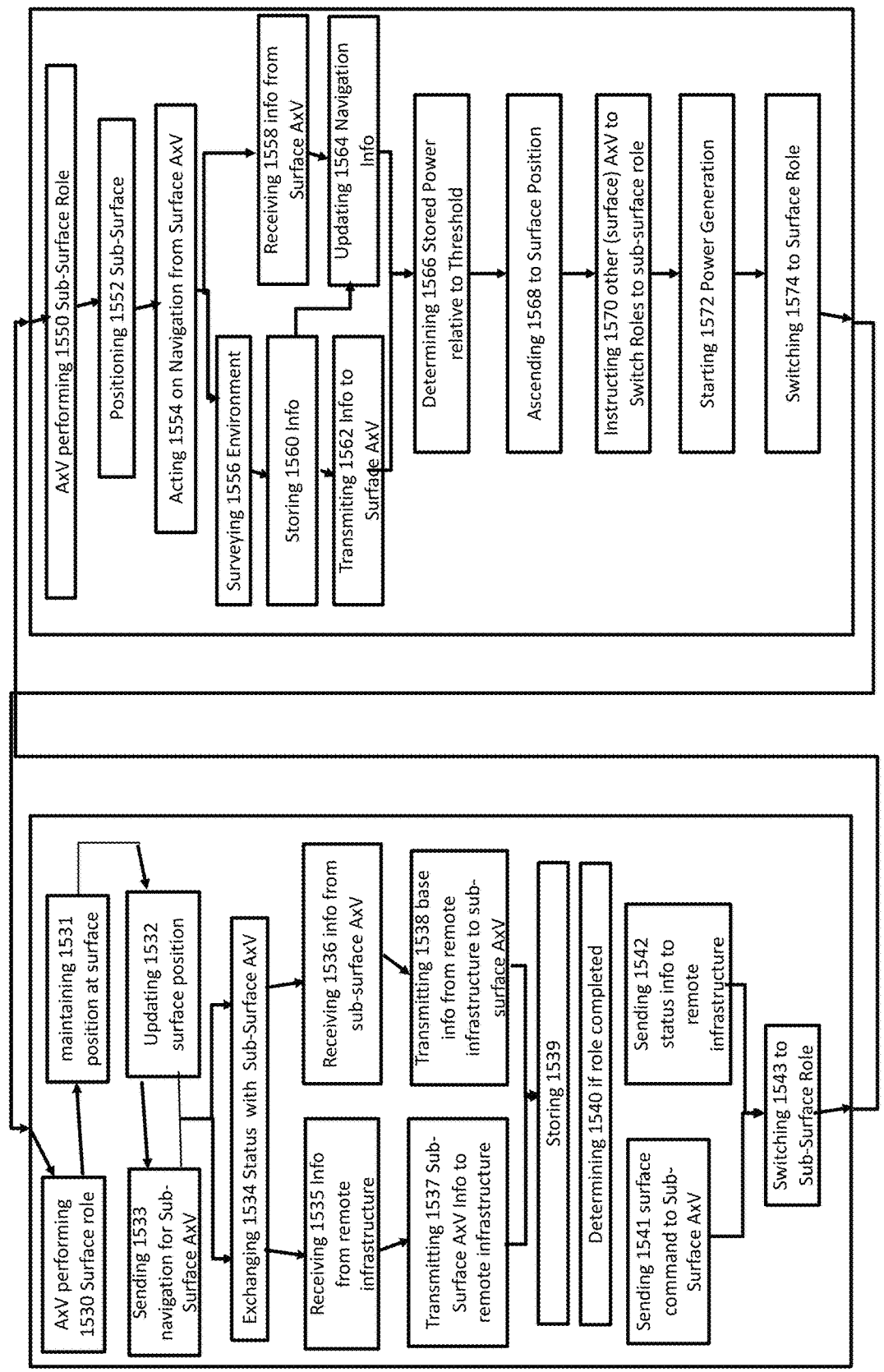
FIG. 9 is a simplified flowchart illustrating a method for autonomous marine surveying.

Illustrated in FIG. 9 is an exemplary method 1500 for autonomous marine survey. It may be understood that, except as otherwise illustrated or described, method 1500 may be identical to method 1400 (shown in FIG. 8). Method 1500 in relation to the surface vehicle role may be identical to method 830 (shown in FIG. 7C) and in relation to the subsurface vehicle role may be identical to method 840 (shown in FIG. 7D), except as otherwise illustrated or described. Method 1500 may be performed by an autonomous marine survey system including a pair of autonomous marine survey vehicles, each identical to the autonomous marine survey vehicle 200 shown in FIG. 6 and described elsewhere in this disclosure.

Referring to FIG. 9, method 1500 may include an autonomous marine survey vehicle performing 1530 the surface role. Method 1530 may include maintaining 1531 surface position for navigation, wherein the surface vehicle may navigate at the surface to maintain 1531 surface position and navigation information which are known and accurate, and for communications with the subsurface vehicle. Method 1530 may include updating position 1532, wherein the surface vehicle may keep updating its surface position 1532 by updating GPS or GNSS position. Method 1530 may include sending 1533 navigation information to the subsurface vehicle, wherein navigation information including the position of the surface vehicle and the range and bearing to the subsurface vehicle may be sent 1533 to the subsurface vehicle. Method 1500 may include the autonomous marine survey vehicle in the surface role exchanging 1534 status information with the subsurface vehicle. In exchanging 1534, upon beginning the surface role, the surface vehicle may exchange status information with the subsurface vehicle and remote infrastructure. Such exchanging 1534 may include the surface vehicle exchanging with the subsurface vehicle, information indicating that the surface vehicle, in fact, is engaged in the surface role, and the surface vehicle position. Method 1500 may include receiving 1535 remote base information from remote infrastructure. Method 1500 may include receiving 1536 subsurface information from the subsurface vehicle, by the surface vehicle. Method 1500 may include transmitting 1537 by the surface vehicle to remote infrastructure, subsurface information received from the subsurface vehicle. Method 1500 may include transmitting 1538 by the surface vehicle to the subsurface vehicle, remote base information received from the remote infrastructure. Method 1500 may include storing 1539 by the surface vehicle, remote base information received from remote infrastructure, and subsurface information received from the subsurface vehicle.

Referring to FIG. 9, method 1500 may include determining 1540 by the surface vehicle, wherein the autonomous controller may determine 1540 whether the Role is complete or incomplete, and whether the status is abort or okay to continue. In determining 1540, if the Role is incomplete and the status is okay to continue, the vehicle may restart the method at exchanging 1534 status information with the subsurface vehicle. Method 1500 may include the surface vehicle sending a surface command 1541 to the subsea vehicle, wherein if autonomous controller determines that the Role is complete, or that the status is abort, then the autonomous controller may cause the surface vehicle to send a surface command 1541 to the subsea vehicle, instructing the subsea vehicle to go to the surface. Method 1500 may include the surface vehicle sending status information 1542, wherein the surface vehicle may send status information 1542 of the subsurface vehicle and surface vehicle, to the remote infrastructure. Method 1500 may include the vehicle in the surface role switching 1543 to the subsurface role, wherein the surface vehicle ends the surface role to take the subsurface role. Surface role switching 1543 may occur, for example, where in determining 1540 the surface role is determined to be completed.

Referring to FIG. 9, method 1500 may include an autonomous marine survey vehicle performing 1550 the subsurface role. Method 1500 may include subsurface positioning, or updating subsurface position 1552, of the vehicle performing 1550 the subsurface role. In updating subsurface position 1552, upon beginning the subsurface role, the subsurface vehicle may update 1552 the subsurface position in the Inertial Navigation System (INS) and with GPS or GNSS position. Method 1500 may include the subsurface vehicle acting 1554 on navigation information received from the surface vehicle, such as by the subsurface vehicle diving from a surface position to the survey location in relation to navigation received from the surface vehicle. Acting 1554 on navigation information may include navigating from the surface vehicle, wherein the subsurface vehicle may exchange navigation 1543 status including position with the vehicle in the surface role. Acting 1554 on navigation information may include DVL navigating, wherein the subsurface vehicle may use the Doppler Velocity Log (DVL) to aid navigation.

Referring to FIG. 9, method 1500 may include surveying 1556, wherein the subsurface vehicle may navigate and operate the payload equipment to perform the survey of the seabed. Method 1500 may include receiving 1558 surface information and remote base information from the surface vehicle, by the subsurface vehicle. Method 1500 may include storing 1560 by the subsurface vehicle, surface information and remote base information received from the surface vehicle. Method 1500 may include transmitting 1562 by the subsurface vehicle to the surface vehicle, subsurface information for the subsurface vehicle and survey information collected by the subsurface vehicle by operating the sensor array.

Referring to FIG. 9, method 1500 may include the subsurface vehicle updating 1564 subsurface navigation information. Updating 1564 navigation information may include the subsurface vehicle exchanging, transmitting and/or receiving updated navigation information, with the surface vehicle. Method 1500 may include determining 1566 by the subsurface vehicle whether stored power meets or falls below a threshold level for stored power that is necessary and sufficient to safely continue operating in the subsurface role with a desired margin of safety. Method 1500 may include ascending 1568 by the subsurface vehicle. Ascending 1568 may include the subsurface vehicle, by the autonomous controller, upon determining that stored power has fallen below the stored power threshold for continuing subsurface operation, causing the vehicle to ascend to the surface position from the subsurface position where the seabed survey is being conducted. Method 1500 may include the subsurface vehicle instructing 1570 the other vehicle in the surface role, to change or switch from the surface role to performing the subsurface role. Method 1500 may include the subsurface vehicle 1574 changing or switching from the subsurface role to performing the surface role. Method 1500 may include the same vehicle, having ascended to the surface position and having changed or switched to performing the surface role, starting 1572 power generation at the surface, to charge the rechargeable batteries onboard the vessel now in the surface role.

In an embodiment, a method for performing autonomous marine surveying of a marine environment for a location, may include operating an on-board power generation system of the autonomous marine survey vehicle to produce, and storing such energy on-board in a power storage system. An on-board power generation system as disclosed may include: an on-board solar power generating system including solar panels mounted on the hull, on-board power generation by seawater consumption, on-board power generation by a fuel cell, on-board power generation by a diesel generator, or other modes of power generation on board the vehicle. Energy produced by on-board power generation as disclosed herein, may be stored in power storage system including a rechargeable battery, or in a chemical structure having suitable energy density, to power submerged operation of the subsea vehicle. A method as disclosed may include communicating with, and supervisory controlling of, the autonomous marine survey vehicle.

In an embodiment, a method for autonomous marine survey may include providing sensor data from sensors. In an embodiment, the sensors may provide acoustic and optical imagery of the seabed. In an embodiment, a method for autonomous marine survey may include storing sensor data provided from sensors, the sensor data including image data, in an on-board data storage system. In an embodiment, a method for autonomous marine survey may include, via a processor, performing steps of an image processing algorithm with the image data at least to determine image data quality on-board the marine vehicle while at the survey location to identify sub-locations where image data quality may be inadequate and thus re-collection of the image data may be required. In an embodiment, a method for autonomous marine survey may include performing, by an on-board navigation system, steps of a navigation algorithm on the surface, underwater or both, using navigation data to plan heading and course.

In an embodiment, a method for autonomous marine survey may include a pair of identical design autonomous marine survey vehicles navigating and transiting from a launch location to a geographically distant, designated survey location, continuously surveying the ocean environment at the designated survey location, and transiting to a designated recovery location. The marine vehicles may be capable of operating interchangeably in the water at the sea surface, semi-submerged with a mast extending above water, and underwater. The pair of autonomous marine vehicles may perform subsea survey and data gathering operations at the designated survey location, in an autonomous manner. Each marine vehicle may produce energy on board and store such energy in a battery or chemical structures, to power operation of the marine vehicle. Each marine vehicle of the pair may engage in communications with the other marine vehicle. Each marine vehicle may include a processor configured to control the communications system, power system, navigation system, maneuvering system, payload management system, data storage system, and an on-board payload quality control system. The payload may include sensors configured to acquire sensor data for the marine environment, such as acoustic and optical imagery of the seabed. The data storage system may include a data storage system configured to store the sensor data including image data. The on-board payload quality control system may be configured to perform analysis of sensor operations and analysis of data quality for sensor data collected by the sensors.

As shown in FIG. 6 for an exemplary embodiment, autonomous marine survey system 100 may include a pair, or greater number, of identical design autonomous marine survey vehicles. Each may be identical to the autonomous marine survey vehicle 200 described elsewhere herein. In an embodiment, the autonomous underwater vehicle (AUV) may include the following: a maneuvering system including a propulsion system and buoyancy control system; a sensor array configured to collect information about the ocean environment; a digital communications system configured to send and receive digital command signals through suitable wireless communications channels or links relative to transceivers on a first one of the vehicles operating at the sea surface in a surface vehicle role, such as to satellite or ground wireless systems; an acoustic communications system configured to send and receive acoustic command signals through the ocean water environment between the first vehicle operating in the surface vehicle role and the second vehicle operating in a sub-surface or subsea vehicle role; an information storage system configured to receive and store information from the sensor array, the digital communications system, and the acoustic communications system; an oxidizing power generation system configured to generate electrical power; a power storage system configured to receive electrical power from the oxidizing power generation system and to provide power to rechargeable batteries of the power storage system; and a control system configured to receive information from the digital communications system, the acoustic communications system, the power storage system, the navigation system, and the sensor array; and the control system configured to transmit information to the propulsion mechanism, the first communications system, the second communications system, the information storage system. The control system may be configured particularly to determine when the amount of electrical energy stored in the power storage system falls below a predetermined threshold; undertake on-board power generation to recharge on-board rechargeable batteries; and, if needed because the vehicle is submerged, to undertake ascending to the surface from a submerged position to begin the on-board power generation.

In an embodiment, a method for surveying a body of water is disclosed. The method may include the following: locating a first autonomous marine survey system substantially at the surface of a body of water; locating a second autonomous marine survey system below the surface of the body of water; autonomously surveying a portion of the body of water by the second autonomous marine survey system; transmitting navigation information from the first autonomous marine survey system on the surface to the second autonomous marine survey system below the surface; storing the surveying information in the second autonomous marine survey system; determining when a power supply of the first or second autonomous marine survey system drops below a predetermined threshold; performing on-board power generation to recharge batteries of a power storage system when each vehicle is located on the sea surface; and coordinating the position and role of the first and second autonomous marine survey systems responsive to the vehicle status and mission objectives.

During the transit the vehicle may autonomously determine when to be on the surface, semi submerged, or submerged to meet requirements of safe navigation, recharging, communications, and other considerations. Upon arriving at a survey site, one or more vehicles may dive, using stored energy, to a predetermined altitude above the sea floor and undertake sonar surveys, coupled with other required data gathering operations, while at least one vehicle remains on the surface providing the navigation solution and collecting surface data. Global Navigation Satellite System (GNSS) course and correction information is received by the surface vehicle via satellite, cellular or radio communications and relayed via acoustic modem to the subsea vehicles. Intermittent navigational updates and corrections may be provided by the surface vehicle during the entire mission duration. When the subsea vehicle batteries are depleted to a given level, it may return to surface and recharge or be replaced by a vehicle previously on the surface. Data samples are sent ashore via satellite to be further reviewed for quality. The vehicles may rotate responsibilities and operate in this manner as many times as needed to complete the survey requirements. This multi-vehicle mission approach enables prolonged time at sea without direct human control.

Identical design first and second autonomous marine survey vehicles may operate in a pair, or in a larger group, and may rotate between a surface vehicle role and a subsurface or subsea vehicle role. The surface vehicle may perform sea surface data collection and geo-location/surface positioning. The surface vehicle may facilitate GPS/GNSS for acoustic positioning and pass it along to the subsea vehicle(s) via acoustic transceivers which may communicate with one subsea vehicle, or multiple subsea vehicles independently or as a group.

The subsea vehicle(s) may receive GNSS position fixes from and communicates position to the surface vehicle at the surface. An Inertial Navigation System (INS) may integrate inertial and gyro measurements, Doppler Velocity Logger (DVL) measurements, GNSS position information, GPS position information, and acoustic position fixes to provide position, orientation and velocity for the vehicle in the subsea vehicle role. The surface vehicle may periodically communicate with the subsea vehicle(s) to provide correction data for the for the vehicle in the subsea vehicle role to reduce position error, based on updating GNSS position information and/or GPS position information of the vehicle in the surface vehicle role.

One or a group of vehicle(s) in the subsea vehicle role may conduct sea bottom survey and data collection. In an embodiment, sea bottom survey and data collection may be performed by a payload including multi-beam sonar, side-beam sonar, and/or single aperture sonar, sub-bottom profilers, magnetometers, and other sensors as required. The payload may utilize output of an Inertial Navigation System (INS) navigation solution, for precise location relative to acquired data.

Payloads may be managed by a Payload Manager (PM) 270 that may control all sensors, communications and payloads while acquired payload data may be stored in a Data Storage System 700 which is capable of data management processes and storage. An on-board Payload Data Quality Control System 280 may provide validation of acquired data, and in an embodiment may perform such validation while the vehicle remains in the survey location, so that surveying may be repeated where data is invalid.

The vehicle in the surface vehicle role may receive and relay metadata generated by the payload as well as the vehicle status from the subsea vehicle and relay them back to the onshore control center over satcom (i.e. Iridium-Next), terrestrial links (4G-LTE). The surface vehicle may receive high level commands from the shore station to relay via acoustic modem to the subsea vehicle(s) to be used for general monitoring, position changes and mission redirection.

When the subsea vehicle's main battery power is expended or depleted to a predetermined threshold level, the vehicle may transition and assume the surface vehicle role, and undertake on-board power generation at the surface and recharge on-board rechargeable batteries of the power storage system, via an on-board electrical recharging system.

Because the autonomous marine survey vehicles are of identical design (single variant) and may operate both on the surface in the surface vehicle role and submerged in the subsea vehicle role, the vehicles may switch roles and responsibilities between the surface vehicle role and subsurface or subsea vehicle role. Specifically, a single variant unmanned autonomous marine survey vehicle as disclosed herein may be capable of operating, interchangeably, on the surface as an Autonomous Surface Vehicle (ASV) or subsea as an Autonomous Underwater Vehicle (AUV).

The autonomous marine survey vehicles may include a hybrid system of rechargeable batteries, such as lithium rechargeable batteries, an air-dependent power plant (fuel cell/diesel) and solar power. The rechargeable batteries may be recharged many times as the vehicles cycle back to the surface from subsea and sustain high-power, high-logistics instrument payloads for extended time periods.

The autonomous marine survey vehicles may derive position and direction from an on-board navigation suite informed by the surface vehicles GNSS data combined with the DVL and Forward-Looking Sonar (FLS) which may provide obstacle avoidance and maintains a spatial track log of obstacle contacts.

In an embodiment, autonomous marine survey vehicles as herein disclosed may include advanced mapping systems, which may utilize low frequency, high resolution synthetic aperture sonar, multi-beam sonar, side beam sonar, and sub-bottom profilers, which may deliver high quality data over a large range and provide high area coverage, collected at a high rate.

In an embodiment, autonomous marine survey vehicles as herein disclosed may include a vehicle navigation system providing survey-quality subsea positioning capabilities, at large scale. In an embodiment, autonomous marine survey vehicles as herein disclosed may include surface and subsurface efficient propulsion and maneuvering systems to ensure that the vehicles have required maneuvering capability, both at the sea surface and in the subsea environment. In an embodiment, autonomous marine survey vehicles as herein disclosed may include sub-sea anchors to be deployed for loitering within about 50 meters from the seabed.

In an embodiment, autonomous marine survey vehicles as herein disclosed may include an on-board Data Storage System 700 (DSS) to record all available information. The Data Storage System 700 may accept commands from Payload Manager 260, for specified activities. The DSS may be capable of processes such as, for example, creating payload log files and indexes; and reporting status to the Payload Manager 260.

In an embodiment, autonomous marine survey vehicles as herein disclosed may include a Payload Manager 270 (PM) module. The Payload Manager 260 module may control aspects of the payload, including: sensors, processes, communications, power and the Data Storage System 700 (DSS). The Payload Manager 260 may receive instructions from a Mission Autonomy module 260 and may send status information to the Mission Autonomy module.

In an embodiment, autonomous marine survey vehicles as herein disclosed may include a Payload Data Quality (PDQ) system 280 to provide validation of acquired data through autonomous on-board processing of such data. The Payload Data Quality (PDQ) system 280 may include near real-time analysis of area coverage, payload sensor alarms, event log, navigation system position uncertainty, vehicle line following, cross track error, vehicle attitude deviations, altitude deviations, and obstacle avoidance events.

In an embodiment, autonomous marine survey vehicles as herein disclosed may include the vehicles configured to work and function within a cooperative acoustic networked navigation architecture, to provide varying grades of absolute positioning accuracies needed for precise ocean data collection.

In embodiment, autonomous marine survey vehicles as herein disclosed may include vehicles capable of creating an ad-hoc long baseline transponder field for deep water high accuracy survey, by anchoring 50 m above the seafloor.

In an embodiment, autonomous marine survey vehicles as herein disclosed may include a design payload power of approximately 1 kW, and may include the capability to survey at speeds of up to 4 knots. These may enable agile and flexible sensor operations with high area coverage rates, with low operational cost and no direct human supervision.

In an embodiment, autonomous marine survey vehicles as herein disclosed may include the vehicles being designed to carry survey and mapping payloads for high-resolution bathymetry, seafloor imagery, and sub-bottom profiling.

In an embodiment, autonomous marine survey vehicles as herein disclosed may include the vehicles being designed to carry surveillance or reconnaissance payloads for detecting and recording communications both in water acoustics and in air radio transmissions. The embodiment may include a mast to hold antennas while the vehicle is semi submerged. The mast may be fixed or retractable.

In an embodiment, autonomous marine survey vehicles as herein disclosed may perform missions requiring persistence and high endurance. In an embodiment, autonomous marine survey vehicles as herein disclosed may be capable of scalable ocean data collection extending to met-ocean, fisheries, oceanographic, and hydrographic observation capabilities.

In an embodiment, autonomous marine survey vehicles as herein disclosed may include high power capacity and availability allowing for high power, automated onboard processing of collected data. This capability may reduce overall "ping to chart time" or processing period, and may provide capability to apply in-situ machine learning to improve real-time, actionable ocean data intelligence.

In an embodiment, autonomous marine survey vehicles as herein disclosed may include autonomous systems software, that may include basic core software, which may include vehicle-based mission management, navigation, payload and data acquisition controls, advanced service oriented workflow, event processing and machine learning modules that may increase system autonomy. In an embodiment, autonomous marine survey vehicles as herein disclosed may include high level vehicle networking, disaster recovery, and/or third-party data processing. In an embodiment, autonomous marine survey vehicles as herein disclosed may include support for customer data storage, access, processing and search via Data Center/Cloud based operations.

In an embodiment, autonomous marine survey vehicles as herein disclosed may include vehicle autonomy sufficient to enable a networked fleet of autonomous vehicles to perform all critical functions of a conventional, manned AUV support vessel and AUVs deployed therefrom.

In an embodiment, autonomous marine survey vehicles as herein disclosed may include, when operating in the surface mode, a member of the vehicle fleet configured to provide enhanced operational support to other vehicles performing surveys at depth. With this support, subsea vehicles may autonomously navigate while collecting and processing high-quality data given a survey area.

In an embodiment, autonomous marine survey vehicles as herein disclosed may include the vehicle having capability to autonomously monitor or self-monitor its' own vehicle subsystems and sensors, perform obstacle avoidance, sensor tuning, automatic survey routing, data QA, and object detection/classification. These functions may allow autonomous on-site evaluations of the survey's success, with reduced need for high-cost data transmission to shore (Satcom, 4G/3G cell).

In an embodiment, autonomous marine survey vehicles as herein disclosed may include providing data collection quality assurance by implementing machine learning for on-board data processing before leaving the operational area. In an embodiment, autonomous marine survey vehicles as herein disclosed may include advanced sensor management that may enable scalable data collection.

Apparatus, methods and systems according to embodiments of the disclosure are described. Although specific embodiments are illustrated and described herein, it may be appreciated by those of ordinary skill in the art that any arrangement which is calculated to achieve the same purposes maybe substituted for the specific embodiments shown. This application is intended to cover any adaptations or variations of the embodiments and disclosure. For example, although described in terminology and terms common to the field of art, exemplary embodiments, systems, methods and apparatus described herein, one of ordinary skill in the art may appreciate that implementations maybe made for other fields of art, systems, apparatus or methods that provide the required functions. The invention should therefore not be limited by the above described embodiment, method, and examples, but by all embodiments and methods within the scope and spirit of the invention.

In particular, one of ordinary skill in the art may readily appreciate that the names of the methods and apparatus are not intended to limit embodiments or the disclosure. Furthermore, additional methods, steps, and apparatus maybe added to the components, functions maybe rearranged among the components, and new components to correspond to future enhancements and physical devices used in embodiments maybe introduced without departing from the scope of embodiments and the disclosure. One of skill in the art may readily recognize that embodiments are applicable to future systems, future apparatus, future methods, and different materials. All methods described herein may be performed in a suitable order unless otherwise indicated herein or otherwise clearly contradicted by context. The use of any and all examples, or exemplary language (e.g., "such as"), is intended merely to better illustrate the disclosure and does not pose a limitation on the scope of the disclosure unless otherwise claimed. No language in the specification should be construed as indicating any non-claimed element as essential to the practice of the disclosure as used herein. Terminology used in the present disclosure is intended to include all environments and alternate technologies that provide the same functionality described herein.

What is claimed is:

1. An autonomous marine survey system for performing a subsea survey of a location, comprising:
   a set of identical design, autonomous marine survey vehicles, instanced by a first and second vehicle, each comprising:
   a maneuvering system, the maneuvering system comprising a propulsion system, the maneuvering system comprising a buoyancy control system, the maneuvering system comprising a steering system;
a sensor array configured to collect information about surroundings at the location where the autonomous marine survey system is located;
an acoustic communications system configured to send and receive acoustic command signals through ocean water to the other of the first and second autonomous marine survey vehicles;
an information storage system configured to receive and store information from the sensor array, a digital wireless communications system, and the acoustic communications system;
an on-board power generation system configured to generate electrical power when operated at the sea surface;
an autonomous control system configured to receive information from the digital wireless communications system, the acoustic communications system, the power generation system, a power storage system, a navigation system, and the sensor array;
the autonomous control system configured to transmit information to the propulsion system, the digital wireless communications system, the acoustic communications system, and the information storage system; and
the autonomous control system configured to determine when the amount of electrical power stored in the power storage system falls below a predetermined threshold, the autonomous control system configured to determine when the amount of energy stored in the power generation system falls below a predetermined threshold.

2. An autonomous marine survey system of claim 1, and comprising:
the power storage system comprising an on-board power storage system configured to receive electrical power from the power generation system and provide power to a rechargeable battery.

3. An autonomous marine survey system of claim 1, and comprising:
the navigation system configured to receive geo-positioning information, the navigation system including a geo-location system configured to determine location of one of the first and second autonomous marine survey vehicles operating at the sea surface, the navigation system including an inertial navigation system configured to determine location and orientation of each autonomous marine survey vehicle operating below the sea surface, the navigation system including an acoustic navigation system configured to determine location and orientation of each autonomous marine survey vehicle operating below the sea surface.

4. An autonomous marine survey system of claim 1, and comprising:
the autonomous control system configured to change role between a surface vehicle role and subsea vehicle role.

5. An autonomous marine survey system of claim 1, and comprising:
the digital wireless communications system configured to send and receive communications through the atmosphere relative to an on-board transceiver when operated at the sea surface.

6. An autonomous marine survey vehicle in an autonomous marine survey system for performing a subsea survey of a location, the autonomous marine survey system comprising a set including first and second of the autonomous marine survey vehicles of identical design, the autonomous marine survey vehicle comprising:

a maneuvering system, the maneuvering system comprising a propulsion system, the maneuvering system comprising a buoyancy control system, the maneuvering system comprising a steering system;
a sensor array configured to collect information about surroundings at the location where the autonomous marine survey system is located;
a digital wireless communications system configured to send and receive communications through the atmosphere relative to an on-board transceiver when operated at the sea surface;
an acoustic communications system configured to send and receive acoustic command signals through ocean water to the other vehicle;
an information storage system configured to receive and store information from the sensor array, digital wireless communications system, and acoustic communications system; and
an on-board power generation system configured to generate electrical power when operated at the sea surface;
an autonomous control system configured to receive information from the digital wireless communications system, the acoustic communications system, the power generation system, a power storage system, and the sensor array;
the autonomous control system configured to transmit information to the propulsion system, the digital wireless communications system, the acoustic communications system, and the information storage system; and
the autonomous control system configured to determine when the amount of electrical power stored in the power storage system falls below a predetermined threshold, the autonomous control system configured to determine when the amount of energy stored in the power generation system falls below a predetermined threshold.

7. An autonomous marine survey vehicle of claim 6, comprising:
the power storage system configured to receive electrical power from the power generation system and provide power to a rechargeable battery.

8. An autonomous marine survey vehicle of claim 6, and comprising:
a navigation system configured to receive geo-positioning information, the navigation system including a geo-location system configured to determine location of one of the first and second autonomous marine survey vehicles operating at the sea surface, the navigation system including an inertial navigation system configured to determine location and orientation of each autonomous marine survey vehicle operating below the sea surface, the navigation system including an acoustic navigation system configured to determine location and orientation of each autonomous marine survey vehicle operating below the sea surface.

9. An autonomous marine survey vehicle of claim 6, and comprising:
the autonomous control system configured to change role between a surface vehicle role and subsea vehicle role.

10. A method for surveying a body of water comprising:
first locating a first autonomous marine survey vehicle substantially at the surface of a body of water;
second locating a second autonomous marine survey vehicle below the surface of the body of water;
autonomously surveying a portion of the body of water by the second autonomous marine survey vehicle;

navigating the second autonomous marine survey vehicle below the surface with acoustic navigation from the first autonomous marine survey vehicle on the surface;

storing the surveying information in the second autonomous marine survey vehicle;

first determining when a respective first power storage system supply of the first autonomous marine survey vehicle drops below a predetermined threshold;

second determining when a second power storage system supply of the second autonomous marine survey vehicle drops below a predetermined threshold;

first charging the first power storage system supply from a respective first power generation system of the first vehicle;

second charging the second power storage system supply from a respective second power generation system of the second vehicle; and coordinating position and role of the first and second autonomous marine survey vehicles responsive to a status determination between a surface vehicle role and a submerged vehicle role.

11. A method for surveying a body of water of claim 10, and comprising:

transmitting via an acoustic communications system acoustic command signals through the water between the first and second autonomous marine survey vehicles.

12. A method for surveying a body of water of claim 10, and comprising:

transmitting via an acoustic communications system acoustic data signals through the water between the first and second autonomous marine survey vehicles.

13. A method for surveying a body of water of claim 10, and comprising:

transmitting communications through the atmosphere relative to an on-board transceiver aboard the first autonomous marine survey vehicle when operated at the sea surface.

14. A method for surveying a body of water of claim 10, and comprising:

changing, by an autonomous control system, roles of the first and second autonomous marine survey vehicles, between surface vehicle role and subsea vehicle role.

15. A method for surveying a body of water of claim 10, and comprising:

determining, by an autonomous control system on-board the first autonomous marine survey vehicle, when an amount of electrical power stored in the first power storage system supply falls below a predetermined threshold;

determining, by an autonomous control system on-board the second autonomous marine survey vehicle, when an amount of electrical power stored in the second power storage system supply falls below a predetermined threshold.

16. A method for surveying a body of water of claim 10, and comprising:

storing, in an information storage system onboard the first autonomous marine survey vehicle, information from a sensor array, digital communications system, and acoustic communications system;

storing, in an information storage system onboard the second autonomous marine survey vehicle, information from a sensor array, digital communications system, and acoustic communications system.

17. A method for surveying a body of water of claim 10, and comprising:

first determining, by a navigation system including a geo-location system, location of one of the first and second autonomous marine survey vehicles operating at the sea surface;

second determining, by the navigation system including an inertial navigation system and acoustic navigation system configured to determine location and orientation of each autonomous marine survey vehicle operating below the sea surface, location and orientation of the first and second autonomous marine survey vehicles when operating below the sea surface.

* * * * *